Nov. 28, 1967    J. A. BARNES ETAL    3,355,304
TWO-STAGE COOKING AND DEHYDRATING PROCESS
FOR POTATOES AND LIKE VEGETABLES
Filed May 27, 1964    2 Sheets-Sheet 1
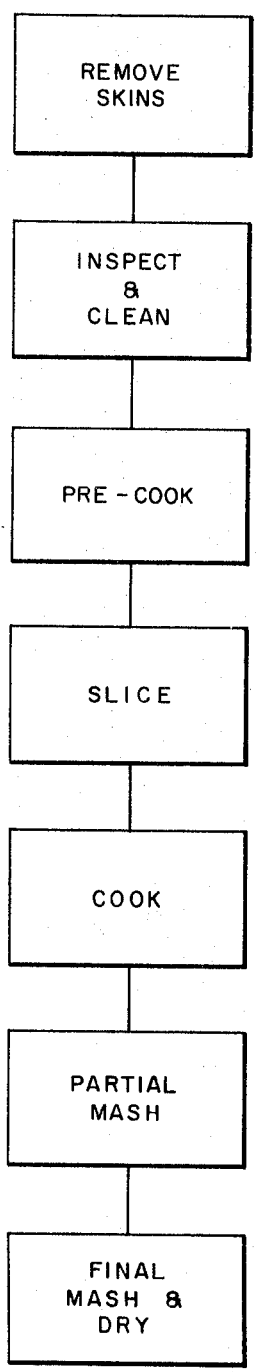
FIG. 1
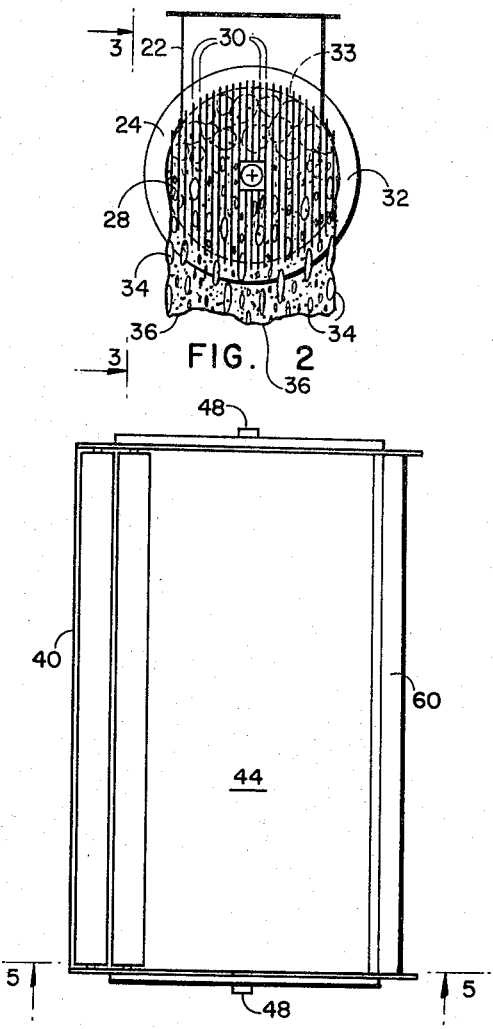
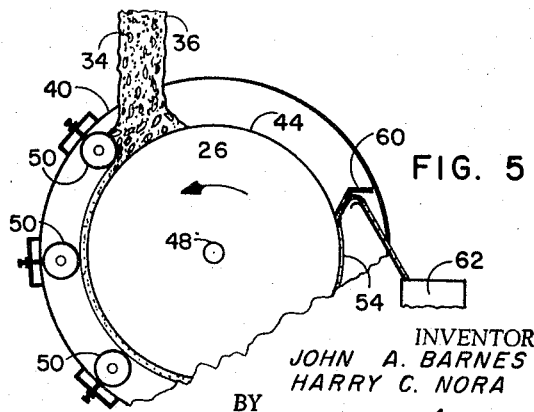
INVENTORS
JOHN A. BARNES
HARRY C. NORA
BY
*James V. Harmon*
ATTORNEY

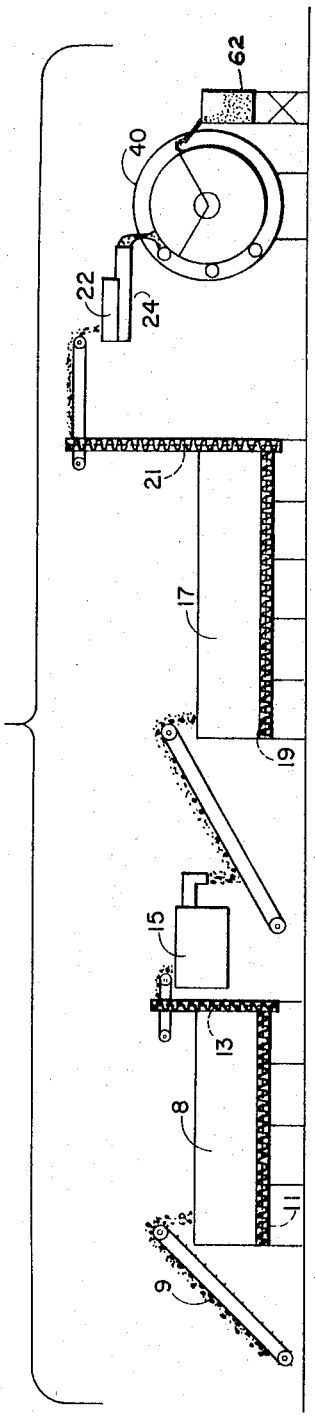
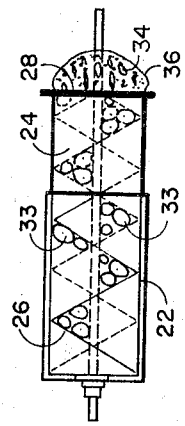
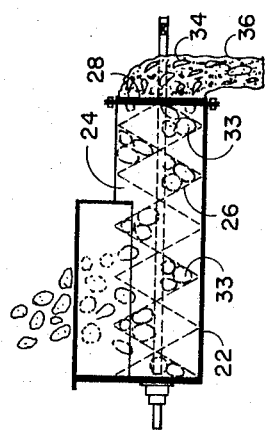

United States Patent Office 3,355,304
Patented Nov. 28, 1967

3,355,304
TWO-STAGE COOKING AND DEHYDRATING PROCESS FOR POTATOES AND LIKE VEGETABLES
John A. Barnes, Circle Pines, and Harry C. Nora, Minneapolis, Minn., assignors to The Pillsbury Company, Minneapolis, Minn., a corporation of Delaware
Filed May 27, 1964, Ser. No. 370,457
14 Claims. (Cl. 99—207)

ABSTRACT OF THE DISCLOSURE

Dehydration process for potatoes and the like including precooking the potatoes while in a whole condition at a first relatively low temperature until the outsides are cooked, subdividing the potatoes, next cooking them at a higher temperature, further subdividing and partially mashing the potatoes, thereafter breaking down the remaining lumps of cooked potato and then drying the potatoes. The remaining lumps are preferably broken down by pressing the material onto the surface of a drying drum to form a thin layer thereon and the temperature of the drum is preferably sufficiently high to cause further cooking.

---

The present invention relates to the preparation of foods and more particularly to the dehydration of vegetables such as potatoes and other tuberous vegetables. The invention is particularly useful for producing dehydrated potatoes which exhibit an excellent texture and taste following rehydration.

Two of the most significant problems encountered in producing palatable dehydrated mashed potatoes relate to the properties of taste and texture which characterize the end product and the capability of a process to yield a product which duplicates the flavor and texture of mashed potatoes produced directly from cooked potatoes. A substantial effort has been expended to improve these properties and as a result of this effort dried mashed potatoes have come into widespread use.

The present products of commerce are, however, deficient in many respects and much room for improvement still remains. Detectable differences in flavor and texture still exist between the presently available dried products and mashed potatoes made directly from cooked potatoes. Moreover, the products of processes known heretofore have little tolerance to high temperatures or mechanical mixing or both during rehydration. As a result, they become quite pasty if rehydrated at temperatures above 170° F. or with vigorous mixing.

Many texture deficiencies of rehydrated dried mashed potatoes are known to be caused at least in part by the presence of free starch which results from the breakdown of potato cells during processing. For this reason, many of the processes previously suggested have incorporated techniques which attempt to prevent the breakdown of potato cells, but the processes presently available have been only partially successful in these attempts.

The commercially accepted processes for producing dehydrated potatoes are of two major types. In the first process, the cooked potatoes are reduced to a mash which is dried on a suitable heater such as a rotating metal drum. The sheet of dried material covering the drum is removed and broken into flakes or chips. These chips are then packed for shipment or storage. According to the second process, after the potatoes are cooked and mashed, the mash is subdivided and mixed uniformly with a relatively large volume of potato granules which have been previously dried. The moisture is then removed from this mixture and a substantial portion of the dried granular product is recycled for mixing with the wet mash.

The process with which the present invention most closely relates is the first of these two processes.

In order to produce a dehydrated flaked potato having satisfactory taste and texture characteristics by prior methods, it has been shown necessary to maintain the thickness of the layer of potato on the drying drum within predetermined limits. Departure from these limits was found to produce a substantial reduction in the quality of the finished product as explained in U.S. Patent No. 2,780,552. Since the process described in this patent was found to have certain shortcomings, an improvement was developed. This improvement is described in U.S. Patent No. 2,759,832 and consists of peeling and slicing the potatoes, cooking them with live steam, mashing the potatoes, diluting the mash to about 20% solids and subsequently drying the mash by applying it as a thin film to a heated surface. Another process described in U.S. Patent No. 2,630,391 proposes that the potatoes be cooked with their skins on. This, however, makes necessary an inefficient and time-consuming operation involving the separation of cooked potato from the skins. Moreover, it is possible under certain conditions for the skins to impart either an undesirable flavor or color to the finished product.

According to a still further improvement described in U.S. Patent No. 2,038,813, the potatoes are precooked at about 140° to 180° F., then cooled with water having a temperature of 70° F. or less for at least 14 minutes and next partially dried under heat pressure. The pressure is then instantly released and the potatoes are dried either in the form of a sheet on the surface of a heated rotating drum or in the form of granules in a fluidized bed drier.

One significant shortcoming in a process of this type is that alternate heating and cooling not only prolongs the processing time but also requires greater heat input which of course raises production costs. Moreover, sliced potatoes will lose heat relatively fast compared with whole potatoes because of their greater surface area when removed from the cooker, thereby further increasing operating costs. A further shortcoming of the process is the fact that a substantial amount of starch is lost in processing as determined in the shrinkage or weight loss which takes place. Moreover, an occasional failure to accurately control numerous operating conditions can produce undesirable variations in the product being processed. Furthermore, substantial gelatinization of starch and an increase in the amount of extracellular starch takes place during the mashing step.

In view of these and other deficiencies of the prior art it is one object of the invention to improve potato dehydration process wherein the finished product exhibits a high quality taste and texture following rehydration.

Yet another object of the invention is the provision of an improved dehydration method which requires less processing time than the prior methods of the type described.

Yet another object of the invention is the provision of an improved potato dehydration process including a means for reducing heat loss between cooking steps.

Yet another object of the invention is the provision of an improved potato dehydration process wherein it is unnecessary to cool the potatoes after the initial cooking step and previous to the final cooking step.

A further object of the invention is the provision of an improved potato dehydration process including means for minimizing the gelatinization of starch during and following the mashing operation.

Still another object of the invention is the provision of an improved potato dehydration process including at least two successive cooking steps, the first of which is carried out at a relatively low temperature with the potatoes in a whole condition and the second at a higher temperature after dividing the whole potatoes into chunks.

A still further object of the invention is the provision of an improved potato dehydration process including precooking the potatoes while in a whole condition for a period of time and at a temperature substantially sufficient to cook the exteriors but leave the centers uncooked, next slicing the potatoes, thereafter cooking the potatoes at a sufficient temperature and length of time so that the pieces are soft enough to be mashed, then partially mashing the potatoes and finally breaking down the remaining lumps of cooked potato and drying the potatoes with continued cooking.

A further object of the present invention is to provide a process for producing dehydrated mashed potatoes having taste and texture properties superior to those of the products presently available.

Another object is to provide a process for producing dehydrated mashed potatoes having increased tolerance to mechanical mixing and high temperatures during rehydration.

It is a further object of the invention to provide a process which does not require a cooling step to produce a product having a quality at least as high as the quality of the product produced by a process having a cooling step.

Other more detailed and specific objects will be apparent from the accompanying specification and attached drawings wherein the same numerals refer to the corresponding parts in the several views and wherein:

FIGURE 1 is a flow chart illustrating the several steps performed in dehydrating potatoes in accordance with the present invention;

FIGURE 2 is a semi-diagrammatic end elevational view of the potato mashing device used for breaking up the potatoes subsequent to the second cooking step;

FIGURE 3 is a side elevational view of the mashing device taken on line 3—3 of FIGURE 2;

FIGURE 4 is a plan view of the roller drier employed for simultaneously mashing and drying the potatoes during final processing;

FIGURE 5 is a transverse sectional view taken on line 5—5 of FIGURE 4;

FIGURE 6 is a plan view of the masher;

FIGURE 7 is a diagrammatic view illustrating the flow of material through the several processing devices.

Briefly, in accordance with a preferred form of the present invention is provided a potato dehydration process including the steps of precooking the potatoes while in a whole condition at a first relatively low temperature until the outsides are cooked, thereafter subdividing the potatoes, next cooking them at a higher temperature, further subdividing and partially mashing the potatoes, thereafter breaking down the remaining lumps of cooked potato and then drying the potatoes. As the potatoes are dried they are preferably heated to a temperature sufficient to cause further cooking.

Referring now to the drawings and particularly to FIGURE 1, it will be seen that the process is begun by peeling the potatoes in any well-known conventional manner, as for example by lye treatment, steam or by means of an abrasive peeler of known construction. After the peeling operation is performed, potatoes are inspected and any injured or damaged areas are removed. This step is ordinarily performed on a conveyor belt or table of a suitable construction. Immediately succeeding the inspection step, the potatoes are transported to a cooking tank 8 by means of a conveyor 9 and precooked in a whole condition at a temperature of from 170 to 190° F. and preferably from between 175 to 185° F. for a period of from about 10–40 minutes and preferably from 20–30 minutes as shown in FIGURES 1 and 7. The tank 8 is provided with an auger conveyor 11 for transporting the potatoes therethrough. While the temperature of the tank 8 and time required for the precooking are interrelated, sufficient time and temperature should be provided to cook or gelatinize the outside while leaving the inside substantially raw. The center of most of the potatoes should reach a temperature of about 140° F. A suitable oxidation retarding agent such as sodium acid pyrophosphate in the amount of about .05% to .10% is preferably added to the initial cooking solution to prevent graying of the potatoes during the dehydration process.

In general, if a slightly higher cooking temperature is used, less time will be required and if the cooking time is increased, a somewhat lower temperature can be employed. On the other hand, if the temperature or time is too great, the finished product will tend to be sticky or pasty upon rehydration. If the temperature is too low and the cooking time insufficient, the finished product may be tough and bitter or exhibit an uncooked or only partially cooked taste.

Following the initial cooking step as described hereinabove, the potatoes are removed from the tank 8 by means of a vertical auger 13 and allowed to fall into a slicer 15 of known construction where they are sliced into flat slabs or discs from about ⅜ to ¾ inch in thickness. When the slabs had a thickness of less than ¼ inch, the rehydrated flakes exhibited a pasty texture.

It was found that since the potatoes were cooked whole during the initial cooking step very little heat was lost from the time the potatoes were transferred from the precooking tank 8 to the slicer 15 and in fact the average temperature drop during transfer from the precooker to the next succeeding cooking step was only about 5 to 10° F.

Following the slicing operation, the potatoes are transported to a cooker such as a steam cooker 17 and are held at a temperature of about 195 to 215° F. and preferably between 200 and 210° F. for a period of from about 10 to 35 minutes. During this operation, the potato chunks reach an internal temperature of about 190° F. The temperature of the cooking step performed in the steam cooker should not be so high as to eliminate the presence of lumps following the mashing step nor should it be so low as to leave the inside tough or woody. The cooker 17 is provided with a horizontal auger 19 for transporting the potatoes therethrough and a vertical auger 21 for removing them. From auger 21 the potatoes fall into a masher 22 consisting of a cylindrical casing 24 and an auger 26 driven by means of a motor (not shown). When the auger is turned, the potatoes are forced through a segmenting device or grille 28, as best seen in FIGURES 2 and 3.

The segmenting device 28 consists of a plurality of fixed members such as parallel vertical bars 30 which are supported at the top and bottom by a retainer ring 32. Potatoes shown at 33 are forced through the bars by the action of auger 26. During the mashing operation, a suitable emulsifier such as acetylated monoglyceride or other suitable emulsifier known to the art are preferably added to the potatoes being processed in an amount of from about 0.3 to .5% for the purpose of reducing the extent to which starch granules are ruptured. The product which emerges from the outlet side of the mashing device comprises unmashed chunks 34 and mashed material 36. The mashed material 36 and chunks 34 each comprise about 50% by weight of the total output of the segmenting device. Although the bars 30 can vary in size, a diameter of about ½ inch and a spacing of about ½ inch apart will be suitable for most purposes.

Following passage through the apparatus illustrated in FIGURES 2 and 3, the final mashing, cooking and drying is carried out with a drying apparatus 40 of FIGURES 4 and 5. The drying apparatus 40 includes a hollow drier roll or drum 44 supported on a shaft 48 for rotation by a horizontal axis. Steam is admitted to the inside of the drum under pressure of from about 90 to 100 lbs. per square inch. The surface of the drum will then be maintained at a temperature of from about 330 to 340° F.

The drum 44 can, of course, vary in size, but a diameter of about 5 feet and a length of 16 feet has been found satisfactory for operation on a commercial scale. In a typical operating run, the drum is rotated at about 4.0 r.p.m. A plurality of horizontally disposed and vertically spaced rolls 50 are positioned parallel to the axis of the drum 44 and spaced a slight distance therefrom to maintain a layer of partially dried potatoes 54 on the lower surface of the drum at a thickness of about .008–.012 inch. The thickness of the layer 54 can be varied but should not be so great that it becomes difficult to break the layer prior to packaging. Thus, at a thickness of about .015 inch, the layer 54 become difficult to cut.

It should be noted that the mashing is then completed by means of application rollers 50. In this operation, the applicator rolls 50 squeeze the partially mashed material onto the surface of the drum to produce the layer 54 while at the same time mashing the chunks 34 remaining after the potatoes have passed through the segmenting apparatus of FIGURES 2 and 3.

The maximum temperature of the drum surface should be about 330 to 340° F., but because of the evaporation in the layer 54, the layer itself will have a temperature of from about 155 to 205° F. Accordingly, it was found that the temperature of the layer 54 when removed from the drum 44 was about 180° F. when the drum surface was maintained at a temperature of about 335° F. The sheet or layer 54 is removed from the drum 44 by a doctor knife 60 and cut into a plurality of strips by means of a powered cutter 62 of known construction.

With the drum 44 rotating at a speed of about 4.0 r.p.m. and the material layer 54 covering approximately ⅔ of the surface of the drum, the layer 54 will remain on the drum for a period of about 15 seconds. The time on the drum can be accurately controlled by regulating the speed of the rotation thereof. Generally speaking, the layer 54 should remain on the drum for a period from about 5 to 20 seconds, but preferably from 8 to 12 seconds. If the layer 54 is allowed to remain on the drum for too long a period of time, it may tend to become scorched or it may be difficult to rehydrate. If it is not on the drum for a great enough period of time, it may be only partially dried, which of course is undesirable since the shelf life will be adversely affected. For satisfactory performance, the moisture should be reduced to no more than about 5 to 8%.

The term "cooking" as used herein is meant heating to a sufficient temperature and for a sufficient period of time to produce a detectable change in texture or flavor. While the potato is on the drying drum for a period of only about 10 to 15 seconds and at a temperature of from about 155 to 205° F., the time period involved and the temperature are sufficient to cause a significant change in the flavor and texture of the potato. For this reason the potatoes can be thought of as undergoing further cooking while on the drying roll. Specifically, while the potato is on the drier roll the texture thereof becomes smoother and the sharp or uncooked flavor therein is removed. Moreover, the cooking operation performed on the roll is accomplished without significant increases in the gelatinization of the starch or significant breakdown of starch cell walls. The term "coarse mash consistency" means consisting of about 25% to 75% by weight of unmashed pieces after being passed through a mashing apparatus of the type illustrated in FIGURES 2, 3 and 6.

According to the present invention, the initial cooking step is performed before the potatoes are sliced or otherwise subdivided, but it was surprising nevertheless to find that there were no problems caused by the temperature differential between the outside surface and the center of the potatoes being cooked. It was, in fact, found desirable since it reduced loss of color and flavor.

A further advantage of the present invention is that the yield has been increased substantially. For example, whereas in the prior art it was possible to obtain a yield of 1 lb. of dried flakes from each 6.2 lbs. of wet peeled whole potatoes, with the present invention it is possible to obtain a yield of 1 lb. of dried flakes from each 5.9 lbs. of wet whole peeled potatoes. This increases in yield is apparently due to the fact that the potatoes are precooked in the whole condition and there is consequently less material broken away from the exposed surfaces.

It should also be noted that in the present invention the temperature of the potatoes drops only about 5 to 10° F. between the first and second cooking steps. This is largely due to the fact that the whole potatoes retain heat very efficiently after initial cooking stage and is, of course, desired since heating costs are reduced.

The improvements of the present invention are available using all varieties of potatoes. Among the varieties which have been used experimentally are Idaho Russets, Pontiacs, Cobblers, Kennebecs and Snowflakes. Improvements in the properties of the dehydrated product were achieved.

While is is possible to eliminate the cooling step with the invention it can be used if desired. If used, the product can be cooled to 60° F. for 20 minutes following the precooking step.

In evaluating the invention, four distinct test procedures demonstrated a reduction in damage to starch granules. The first of these is the marked improvement in texture as determined in standard taste panel tests. The product was found to be less pasty and more grainy than potatoes manufactured in accordance with the prior art. It was found that they had less tendency to dry the mouth. Less starch granular damage was also illustrated by immersing the dehydrated flakes in an iodine solution. In the flakes manufactured in accordance with the prior art, the iodine diffused to the center of the flake in a period of 30 minutes causing the entire flake to turn a blue color. The flakes manufactured in accordance with the invention, the blue coloration was present only at the periphery of the flake. The potatoes processed in accordance with the invention were also found to exhibit less flavor loss as determined by taste tests. Finally, the finished product of the invention exhibits a somewhat yellow color rather than a pure white color indicating a reduction in the loss of pigment from the starch cells.

To facilitate a more complete understanding of the present invention, the following illustrative examples are offered:

Example 1

Field run potatoes were washed and lye peeled in a conventional manner. The peeled potatoes were inspected and damaged sections were removed. The potatoes were then precooked at a temperature of 170° F. for about 10 minutes in a solution of about .05% sodium acid pyrophosphate. They were then immediately sliced into slabs having a thickness of about ⅜ inch. They were then cooked in a steam cooker at a temperature of about 200° F. for a period of about 15 minutes to give a coarse mash consistency. The potatoes were then transferred to a masher of the type illustrated in FIGURES 2 and 3 and mashed to a consistency of about 50 parts smooth mash and 50 parts chunks.

As the potatoes passed through the masher, a solution of .3% acetylated monoglyceride was sprayed into the masher. The partially mashed material was then transferred to a roller drier of the type shown in FIGURES 4 and 5 and having a surface temperature of about 330° F. and retained on the drum for about 5 seconds, then removed and chopped into flakes.

Example 2

Field run potatoes were washed and lye peeled in a conventional manner. The peeled potatoes were inspected and damaged sections were removed. The potatoes were then precooked at a temperature of 190° F. for about 40 minutes in a solution of about .10% sodium acid pyrophosphate. They were then immediately sliced into slabs having a thickness of about ¾ inch. They were then cooked in a water immersion cooker at a temperature of about 210° F. for a period of about 35 minutes to give a coarse mash consistency. The potatoes were then transferred to a masher of the type illustrated in FIGURES 2 and 3 and mashed to a consistency of about 40 parts smooth mash and 60 parts chunks.

As the potatoes passed through the masher, a solution of .5% acetylated monoglyceride was sprayed into the masher. The partially mashed material was then transferred to a roller drier of the type shown in FIGURES 4 and 5 and having a surface temperature of about 340° F. and retained on the drum for about 20 seconds, then removed and chopped into flakes.

Example 3

Field run sweet potatoes are washed and lye peeled in a conventional manner. The peeled sweet potatoes are inspected and damaged sections are removed. The sweet potatoes are then precooked at a temperature of 180° F. for about 30 minutes in a solution of about .10% sodium acid pyrophosphate. They are immediately sliced into slabs having a thickness of about ½ inch. They are then cooked in a steam cooker at a temperature of about 216° F. for a period of about 20 minutes to give a coarse mash consistency. The sweet potatoes are then transferred to a masher of the type illustrated in FIGURES 2 and 3 and mashed to a consistency of about 30 parts smooth mash and 70 parts chunks.

As the sweet potatoes pass through the masher, a solution of .5% acetylated monoglyceride is sprayed into the masher. The partially mashed material is then transferred to a roller drier of the type shown in FIGURES 4 and 5 and having a surface temperature of about 335° F. and retained on the drum for about 10 seconds, then removed and chopped into flakes.

Example 4

Field run rutabagas are washed and lye peeled in a conventional manner. The peeled rutabagas are inspected and damaged sections are removed. The rutabagas are then precooked at a temperature of 170° F. for about 10 minutes in a solution of about .05% sodium acid pyrophosphate. They are then immediately sliced into slabs having a thickness of about ⅜ inch. They are then cooked in a steam cooker at a temperature of about 200° F. for a period of about 15 minutes to give a coarse mash consistency. The rutabagas are then transferred to a masher of the type illustrated in FIGURES 2 and 3 and mashed to a consistency of about 50 parts smooth mash and 50 parts chunks.

As the rutabagas pass through the masher, a solution of .4% acetylated monoglyceride is sprayed into the masher. The partially mashed material is then transferred to a roller drier of the type shown in FIGURES 4 and 5 and having a surface temperature of about 340° F. and retained on the drum for about 10 seconds, then removed and chopped into flakes.

Example 5

Field run potatoes were washed and lye peeled in a convetnional manner. The peeled potatoes were inspected and damaged sections were removed. The potatoes were then precooked at a temperature of 180° F. for about 30 minutes in a solution of about .10% sodium acid pyrophosphate. They were then immediately sliced into slabs having a thickness of about ½ inch. They were then cooked in a steam cooker at a temperature of about 216° F. for a period of about 20 minutes to give a coarse mash consistency. The potatoes were then transferred to a masher of the type illustrated in FIGURES 2 and 3 and mashed to a consistency of about 30 parts smooth mash and 70 parts chunks.

As the potatoes passed through the masher, a solution of .5% acetylated monoglyceride was sprayed into the masher. The partially mashed material was then transferred to a roller drier of the type shown in FIGURES 4 and 5 and having a surface temperature of about 335° F. and retained on the drum for about 10 seconds, then removed and chopped into flakes.

Example 6

Field run potatoes were washed and lye peeled in a conventional manner. The peeled potatoes were inspected and damaged sections were removed. The potatoes were then precooked at a temperature of 190° F. for about 40 minutes in a solution of about .10% sodium acid pyrophosphate. They were then immediately sliced into slabs having a thickness of about ¾ inch. They were then cooked in a steam cooker at a temperature of about 210° F. for a period of about 35 minutes to give a coarse mash consistency. The potatoes were then transferred to a masher of the type illustrated in FIGURES 2 and 3 and mashed to a consistency of about 70 parts smooth mash and 30 parts chunks.

As the potatoes passed through the masher, a solution of .5% acetylated monoglyceride was sprayed into the masher, the partially mashed material was then transferred to a roller drier of the type shown in FIGURES 4 and 5 and having a surface temperature of about 340° F. and retained on the drum for about 20 seconds, then removed and chopped into flakes.

Example 7

Field run potatoes were washed and lye peeled in a conventional manner. The peeled potatoes were inspected and damaged sections were removed. The potatoes were then precooked at a temperature of 170° F. for about 10 minutes in a solution of about .05% sodium acid pyrophosphate. The potatoes were then cooled by immersion in water at 60° F. for 20 minutes. They were then immediately sliced into slabs having a thickness of about ⅜ inch. They were then cooked in a steam cooker at a temperature of about 200° F. for a period of about 15 minutes to give a coarse mash consistency. The potatoes were then transferred to a masher of the type illustrated in FIGURES 2 and 3 and mashed to a consistency of about 50 parts smooth mash and 50 parts chunks.

As the potatoes passed through the masher, a solution of .3% acetylated monoglyceride was sprayed into the masher. The partially mashed material was then transferred to a roller drier of the type shown in FIGURES 4 and 5 and having a surface temperature of about 330° F. and retained on the drum for about 5 seconds, then removed and chopped into flakes.

While the invention is described in connection with a preferred embodiment thereof, it will be understood that it is not intended to limit the invention thereto but rather it is intended to cover all alternative constructions and modifications falling within the spirit and scope of the appended claims.

I claim:

1. An improved dehydration process for potatoes and the like including at least two successive cooking steps the first of which is carried out at a lower temperature than the second and a drying step the improvement comprising carrying out the first cooking step with the potatoes in a whole condition and the second cooking step after the potatoes have been divided into pieces.

2. An improved dehydration process for potatoes and the like including the steps of precooking the potatoes at a relatively low temperature, thereafter slicing the potatoes, next cooking the potatoes at a higher temperature, further subdividing the partially cooked potatoes and thereafter drying the potatoes with continued cooking.

3. The process according to claim 2 wherein the potatoes are pressed to break down the remaining lumps of cooked potatoes just prior to drying.

4. A dehydration process for potatoes and the like comprising the steps of cooking the potatoes by heating to a temperature of about 165 to 195° F., thereafter cutting the potatoes into pieces, next cooking the cut potatoes at a temperature of from about 195 to 215° F., thereafter mashing said potatoes, next forming the mashed potatoes into a thin layer and heating the layer to remove the moisture therefrom.

5. The process according to claim 4 wherein the potatoes are partially mashed during said mashing step and wherein the remaining lumps are removed during the formation of the potatoes into said thin layer.

6. The process according to claim 4 wherein the first said cooking step is carried out by immersing said potatoes in water and the second said cooking step is carried out by exposing the precooked and cut vegetables to steam.

7. A dehydration process for potatoes comprising the steps of peeling said potatoes, inspecting the peeled potatoes and removing spoiled and damaged portions therefrom, next precooking the potatoes by immersing them in water at a temperature of from about 165 to 195° F., next slicing the potatoes so that the cross-sectional thickness of each slice is about ¾ inch or under while maintaining the temperature thereof at least 120° F., further cooking the sliced potatoes by exposing them to a cooking medium having a temperature of from about 195 to 215° F., partially mashing the potatoes to form a mash consisting of at least 25% by weight of unmashed potatoes, forming the partially mashed potatoes into a thin layer and exposing said layer to sufficient heat to lower the moisture content below about 10%.

8. The process according to claim 7 wherein the said layer of potatoes is heated during said drying step to a temperature of about 155 to 205° F. for a period of 10 seconds.

9. In a process for preparing dehydrated mashed potatoes comprising the steps of cooking raw potatoes, mashing the resulting cooked potatoes, and dehydrating the resulting mashed potatoes, the improvement which comprises cooking said potatoes in two stages and slicing the potatoes into pieces having a thickness of about one-half inch after the first of said stages and before the second of said stages.

10. The process of claim 9 wherein said potatoes are only partially mashed during said mashing step.

11. The process of claim 9 wherein said cooking stage following the slicing stage is carried out at a higher temperature than said first stage.

12. In a process for preparing dehydrated mashed potatoes comprising the steps of precooking raw potatoes in water at a temperature ranging from 125 to 180° F. for 15 to 45 minutes, slicing said precooked potatoes into pieces, cooking the sliced and precooked potatoes until said potatoes have a coarse mash consistency, partially mashing the cooked potatoes, pressing the partially mashed potatoes into a layer and dehydrating the resulting layer.

13. A process for preparing dehydrated potatoes comprising peeling the potatoes, precooking the potatoes while in a whole condition until the exteriors have a cooked consistency and the interiors have a substantially raw consistency, dividing the potatoes into pieces while maintaining them at an elevated temperature, cooking the pieces until they have a coarse mash consistency, mashing the potatoes and thereafter drying said mashed potatoes.

14. The process according to claim 13 wherein the potatoes are only partially mashed during said mashing step, thereafter formed into a layer of uniform thickness and heated until the moisture content is less than about 10%.

No references cited.

A. LOUIS MONACELL, *Primary Examiner.*

D. M. NAFF, *Assistant Examiner.*